(12) United States Patent
Griffith et al.

(10) Patent No.: US 7,740,363 B2
(45) Date of Patent: Jun. 22, 2010

(54) DEFORMABLE-MIRROR HOLDER (75) Inventors: Michael S Griffith, Chelmsford (GB);
Nicholas J Archer, Chelmsford (GB);
Leslie C Laycock, Chelmsford (GB)

(73) Assignee: BAE Systems plc, London (GB)

( * ) Notice: Subject to any disclaimer, the term of this patent is extended or adjusted under 35 U.S.C. 154(b) by 461 days.

(21) Appl. No.: 10/538,120

(22) PCT Filed: Dec. 18, 2003

(86) PCT No.: PCT/GB03/05547
§ 371 (c)(1),
(2), (4) Date: Jun. 7, 2005

(87) PCT Pub. No.: WO2004/057398
PCT Pub. Date: Jul. 8, 2004

(65) Prior Publication Data
US 2006/0082909 A1 Apr. 20, 2006

(30) Foreign Application Priority Data
Dec. 23, 2002 (GB) ................... 0230038.2
Apr. 30, 2003 (GB) ................... 0309979.3

(51) Int. Cl.
*G02B 7/185* (2006.01)
(52) U.S. Cl. ...................... 359/847; 359/849
(58) Field of Classification Search ................. 359/224, 359/847, 849
See application file for complete search history.

(56) References Cited
U.S. PATENT DOCUMENTS

| | | | |
|---|---|---|---|
| 3,610,738 A * | 10/1971 | Bochmann | 359/847 |
| 3,972,600 A | 8/1976 | Cobarg | |
| 4,733,945 A | 3/1988 | Bacich | |
| 5,651,458 A * | 7/1997 | Brosmith et al. | 206/308.1 |
| 5,801,891 A | 9/1998 | Lloyd | |
| 6,041,923 A * | 3/2000 | Furutsu | 206/308.1 |
| 6,116,417 A * | 9/2000 | Yoshinaga et al. | 206/310 |
| 6,229,657 B1 * | 5/2001 | Holderer et al. | 359/822 |
| 6,307,688 B1 | 10/2001 | Becker et al. | |
| 6,388,823 B1 | 5/2002 | Becker et al. | |
| 6,398,373 B1 | 6/2002 | Guzman et al. | |

(Continued)

FOREIGN PATENT DOCUMENTS

EP   0 743 541   11/1996

(Continued)

OTHER PUBLICATIONS

UK Search Report for GB 0230038.2 dated Mar. 4, 2003.

(Continued)

*Primary Examiner*—Ricky D Shafer
(74) *Attorney, Agent, or Firm*—Nixon & Vanderhye P.C.

(57) ABSTRACT

This invention relates to a deformable-mirror holder for holding a mirror in a desired position, to within accepted tolerances, even whilst the mirror is deforming or in a deformed state. In particular, this invention relates to a holder for a bimorph mirror. A deformable-mirror holder is provided comprising a body with a central aperture for receiving a deformable mirror, the central aperture being defined by a plurality of flexible beams, with each flexible beam having an end shaped to provide a supporting surface and a flexible portion that connects the beam's end to the holder's body.

17 Claims, 6 Drawing Sheets

U.S. PATENT DOCUMENTS

| | | |
|---|---|---|
| 6,425,671 B1 | 7/2002 | Adler et al. |
| 6,552,862 B2 * | 4/2003 | Dieker ........................ 359/819 |
| 7,193,794 B2 * | 3/2007 | Beck et al. .................. 359/822 |
| 7,264,363 B2 * | 9/2007 | Griffith et al. ............... 359/845 |
| 7,374,302 B2 * | 5/2008 | Griffith et al. ............... 359/849 |

FOREIGN PATENT DOCUMENTS

| | | |
|---|---|---|
| GB | 61-285424 | 12/1986 |
| WO | 95/21394 | 8/1995 |
| WO | 02/12948 | 2/2002 |
| WO | 03/016976 | 2/2003 |

OTHER PUBLICATIONS

UK Search Report for GB 0309979.3 dated Sep. 16, 2003.
European Search Report for EP 02 25 8826 dated May 22, 2003.
International Search Report for PCT/GB03/05547 dated Apr. 27, 2004.
Ikramov et al., Bimorph adaptive mirror, *Soviet Journal of Quantum Electronics, American Institute of Physics*, vol. 22, No. 2, Feb. 1, 1992, pp. 163-166, XP000273608.

* cited by examiner

DEFORMABLE-MIRROR HOLDER

This application is the U.S. national phase of international application PCT/GB2003/005547 filed 18 Dec. 2003 which designated the U.S. and claims benefit of GB 0230038.2, filed 23 Dec. 2002, and GB 0309979.3 filed 30 Apr. 2003, the entire contents of each of which are hereby incorporated by reference.

This invention relates to a deformable-mirror holder for holding a mirror in a desired position, to within accepted tolerances, even whilst the mirror is deforming or in a deformed state. In particular, this invention relates to a holder for a bimorph mirror.

Deformable mirrors are often used in the field of adaptive optics. For example, phase distortions in a signal may be sensed by a wavefront sensor and these distortions may be corrected for by an adaptive mirror. Such adaptive mirrors may be employed in numerous fields, including:

- imaging, for example adaptive mirrors are used in astronomy to improve the resolution of earth-based telescopes that are otherwise affected by atmospheric distortions;
- laser sensing, where the amount of laser light that can be delivered onto a target is significantly increased by using an adaptive mirror to correct for atmospheric distortions—this enables either better information to be obtained or objects to be identified at a greater range; and
- laser generation, where an adaptive mirror can be used intracavity within a high power laser to counter the thermal blooming that can be otherwise induced by the high concentration of laser light inside the cavity.

Bimorph deformable mirrors have been proposed as low cost adaptive mirrors. The two main operational parameters of a bimorph mirror are its bandwidth and its stroke. Bandwidth determines how quickly the mirror can be deformed and hence, for example, how quickly the mirror can respond to the variations in atmospheric turbulence. Stroke corresponds to the maximum displacement of the mirror when deformed and this determines, for example, the level of turbulence that can be corrected. Ideally, both bandwidth and stroke would be maximised. However, conventional designs mean that there is a reciprocal relationship between these two parameters, and one parameter can only be improved at the expense of the other. Therefore, to date, designers have always looked for ways to improve either the resonant frequency or the stroke independently from each other.

Figure 1:
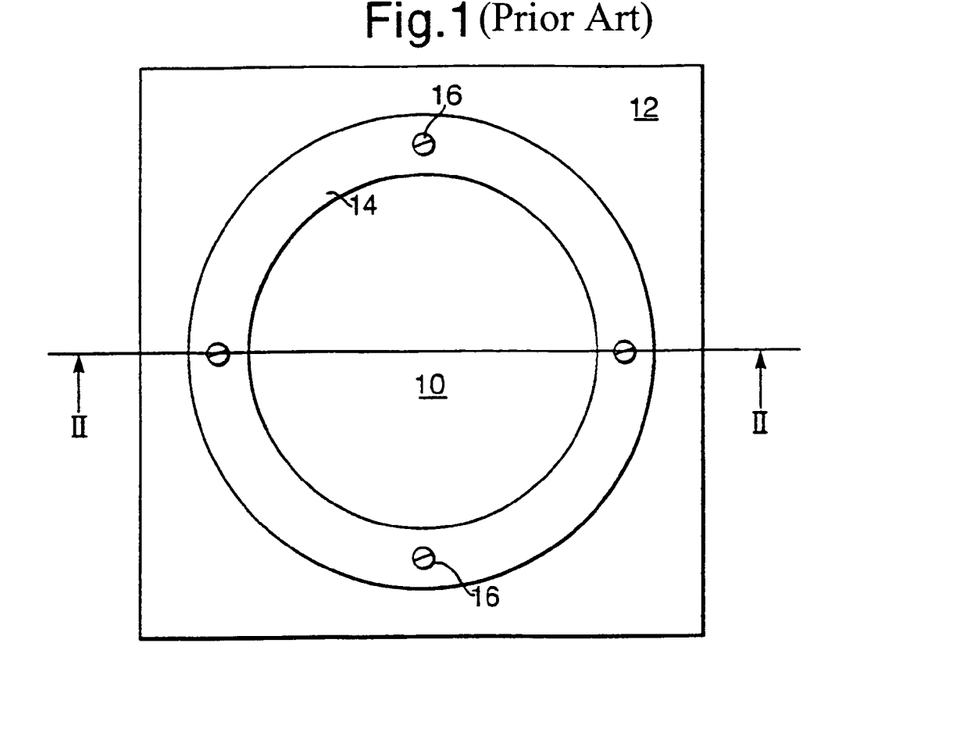
FIG. 1 is a plan view of a deformable mirror and a mount according to the prior art.
Figure 2:
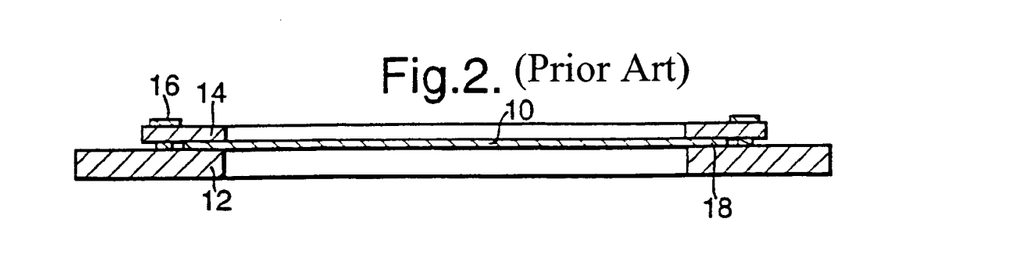
FIG. 2 is a cross-section through line II-II of FIG. 1 showing the mirror in a relaxed state.
Figure 3:
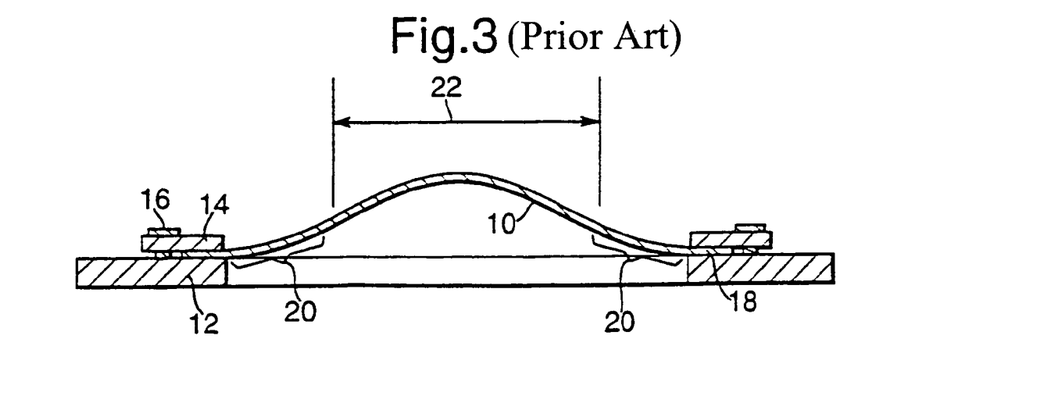
FIG. 3 corresponds to FIG. 2 but with the mirror in a state of exaggerated deformation thereby illustrating the problem of dead space and the relatively small active area.
Figure 4:
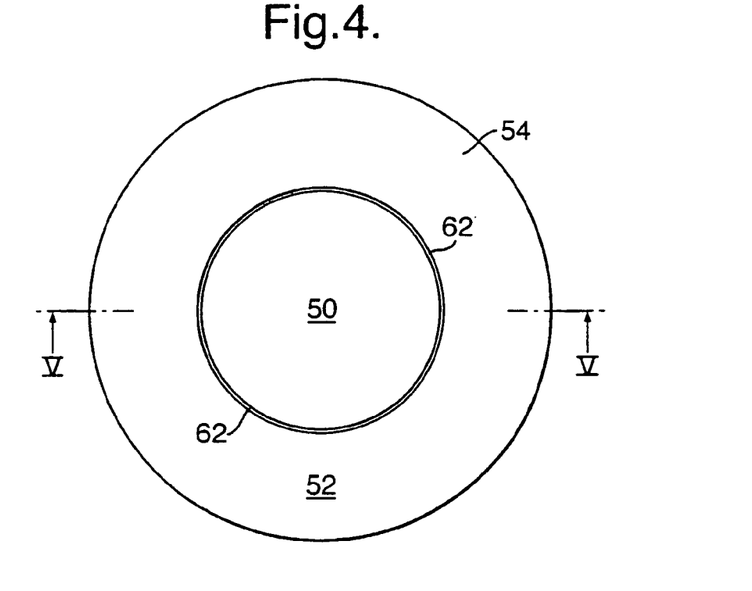
FIG. 4 is a plan view of a deformable mirror and a mount according to a first embodiment the present invention.

Conventionally, deformable mirrors are supported rigidly around their edge, for example an annular ring overlapping the periphery of the mirror is used to hold the mirror firmly in position. Such an arrangement benefits from being simple yet rugged. However, it has an inherent disadvantage in that it creates a dead space around the mirror's edge. This corresponds both to the area of the mirror held firmly under the annular ring and also to the adjacent area. This is because the useable area of the deformable mirror (the active area) must bend to adopt a desired profile, for example either a concave or a convex shape. The annular area between the active area and the annular ring must bend in the opposite sense and so forms an area of inflexion that has undesirable optical properties. Hence the active area occupies only a central portion of the whole mirror. This is illustrated in FIGS. 1 to 3, albeit with the deformation of the mirror exaggerated for the sake of clarity.

One way of alleviating this problem is to clamp the mirror at only three positions, such that the mirror edge can twist. However, this arrangement is to the detriment of ruggedness and the twisting introduces unwanted distortions leading to an optically inferior performance.

Against this background, the present invention resides in a deformable-mirror holder comprising a body with a central aperture for receiving a deformable mirror, the central aperture being defined by a plurality of flexible beams, with each flexible beam having an end shaped to provide a supporting surface and a flexible portion that connects the beam's end to the holder's body. The supporting surface is provided for supporting a peripheral edge of the mirror.

Accordingly, we have devised a deformable-mirror holder that simply supports the mirror uniformly around the edge and where the beams deflect with the mirror as it deforms, thereby allowing the deformable mirror to move like a simply-supported diaphragm. In this way, the deformable mirror is supported such that the ratio of the total diameter to active diameter is minimised. In addition, the above holder allows the mirror to be as small as possible.

Optionally, the ends of the flexible beams are co-joined to form a unitary structure shaped to provide a supporting surface. Such a structure would support the mirror around the entirety of its peripheral edge.

Preferably, the beams' ends lie in the plane of the mount's body such that, in use, the mirror is positioned within the mount's body. This simple arrangement ensures that the holder's body affords the mirror an element of protection. Alternatively, the beam's ends may lie outside of the plane of the body such that the mirror is held clear of the holder's body.

Optionally, at least one beam is generally L-shaped such that one leg of the L-shape provides the flexible portion and the other leg of the L-shape provides the supporting surface of the beam's end. In a currently preferred embodiment, the internal corner of the L-shaped beam has a shoulder that extends part of the way along both legs of the L-shape. This adds rigidity to the part of the beam that supports the mirror in use and a flexible neck is created that allows the supporting end to bend with the mirror.

Preferably, the plurality of flexible beams are arranged around the entire aperture. Alternatively, a small number of beams may be provided around the aperture, for example three or four equispaced around the aperture. Where the beams are arranged around the entire aperture, the width of the beams may optionally be larger than the separation between beams. Preferably, the width of the beams is greater than four times the separation between beams. This arrangement means that the holder is flexible in the radial direction, but exhibits stiffness in all other directions.

Optionally, the flexures are shaped to provide vertical movement at the mirror's edge. Each of the flexures could have a bar shape for supporting a continuous ring, which in turn could be used to support the mirror for example.

Optionally, wire bonding techniques can be effectively applied in the present invention where a large number of connections to piezoelectric (PZT) elements on a mirror are required to be made.

The present invention also extends to a deformable mirror and a deformable-mirror holder as described above.

In order that the invention can be more readily understood, reference will now be made, by way of example only, to the accompanying drawings in which.

A deformable bimorph mirror 10 and its mount 12 according to the prior art are shown in FIGS. 1 to 3. As can be seen, the mirror 10 is disc-shaped and is supported by the mount body 12. The mirror 10 is held firmly in position by an annular ring 14 that urges the mirror 10 against the mount body 12 via four screws 16. FIG. 3 shows the mirror 10 in a deformed state such that, in this example, it adopts a convex profile for light approaching from above. Ideally, the desired convex profile should extend across all the mirror 10, such that all the mirror 10 is available for reflecting light in the desired manner.

However, the peripheral edge 18 of the mirror 10 is held firmly between the annular ring 14 and the mount body 12 and so cannot bend. Moreover there is a region 20 of the mirror 10 that adopts an area of inflexion to bridge the peripheral edge 18 of the mirror 10 and the convex portion 22 at the centre of the mirror 10. It is of course this convex-shaped part 22 of the mirror 10 that forms the active (i.e. useable) part 22 of the mirror 10. This active part 22 of the mirror 10 is shown in FIG. 3.

A deformable bimorph mirror 50 and a mount 52 according to a first embodiment of the present invention are shown in FIGS. 4 to 8. The mount 52 in this case is simpler when compared to the prior art in that the mount 52 is a unitary structure made from stainless steel. The mount 52 comprises a round body 54 that defines a central circular aperture 56. The aperture 56 is shaped and sized to receive the disc-shaped deformable bimorph mirror 50 therein. Hence, the mirror 50 is held in a protected position within the mount 52.

Figure 7:
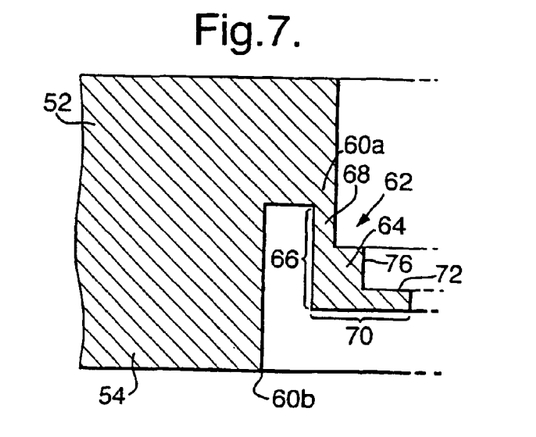
FIG. 7 is a detail from FIG. 5.

Whilst the outer edges of the mount's body 54 are regular, the internal edges 58 are stepped to form a series of three interconnected and concentric circular apertures 56a-c that increase in size from top to bottom. The stepped inner profile 58 of the mount 52 produces a series of three shoulders 60a-c. Twenty generally L-shaped flexible beams 62 extend downwardly in cantilever fashion from the topmost 60a of these shoulders 60a-c. The twenty beams 62 are of identical size and shape and are equispaced around the circular topmost shoulder 60a. The beams 62 are L-shaped such that they extend downwardly from the topmost shoulder 60a before turning through 900 to extend inwardly towards the centre of the middle aperture 56b. Rather than having a pure L-shape, a square-shaped support shoulder 64 extends from the internal corner of each beam 62 as best seen in FIG. 7. The support shoulder 64 only extends partially up the height of the upright portion 66 of the beam 62, thereby leaving a narrow neck 68 in the portion of the beam 62 that bridges the topmost shoulder 60a of the mount body 54 and the support shoulder 64 of the beam 62.

Figure 8:
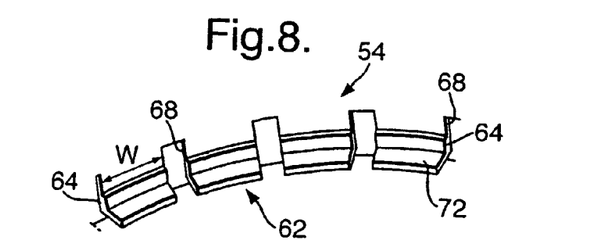
FIG. 8 is a perspective view of part of the mount of FIG. 5.

It is this neck 68 that gives the beam 62 its flexibility, i.e. this neck 68 can be deformed to allow the beam 62 to deflect and bend. The length and thickness of the neck 68 of the beams 62 are chosen to achieve the desired flexing properties. FIG. 8 shows four of the beams 62 in perspective and indicates the width W of the beams 62 relative to their separation. It is the relative width of the beams 62 that gives the required degree of stiffness in the plane of the mirror 10.

The inwardly-extending portion 70 of the beam 62 extends beyond the support shoulder 64 to provide an upwardly-facing support surface 72 for receiving the mirror 50. The mount 52 and the beams 62 are sized such that the mirror 10 may be received within the beams 62 to be supported from below by the support surfaces 72 and so that the mirror's edge 74 fits snugly against the upright face 76 of the support shoulders 64. Hence, the mirror 50 is held firmly in place.

Figure 5:
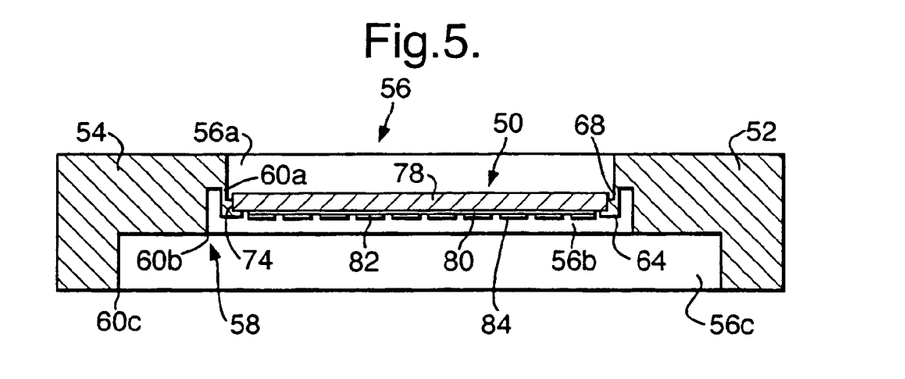
FIG. 5 is a cross-section through line V-V of FIG. 4 showing the mirror in a relaxed state.
Figure 6:
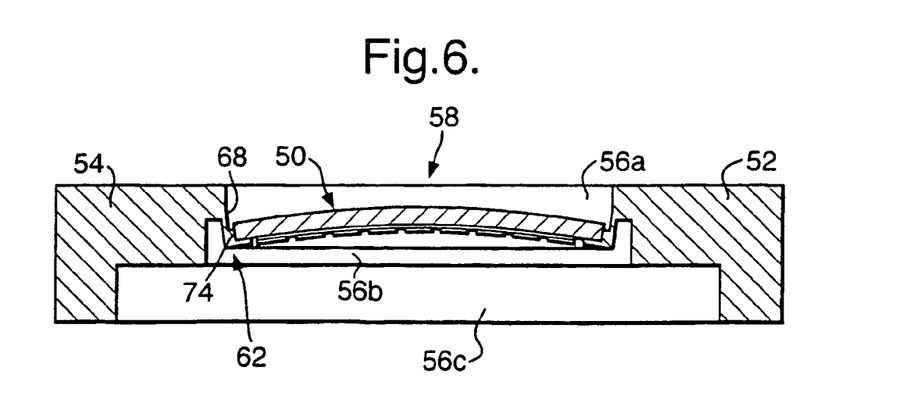
FIG. 6 corresponds to FIG. 2 but with the mirror in a state of deformation.

The mirror 50 is best seen in FIG. 5. The mirror 50 comprises a copper substrate 78 whose outer face provides a reflecting surface by virtue of a series of thin dielectric coatings provided on the outer surface (not shown). An active piezoelectric element 80 is bonded to the non-reflective side copper substrate 78 using epoxy resin 82. It is important to ensure that a thin, uniform layer of the epoxy resin 82 is used to bond the piezoelectric element 80 to the substrate 78 in order to ensure maximum (and uniform) coupling efficiency of stress from the piezoelectric element 80 to the substrate 78. In this embodiment, this is achieved by mixing a small amount of spacers with the glue (these can be for example, silica/glass/polymerics/spheres or rods). This enables a known, uniform thickness of epoxy resin/glue to be formed. An array of forty-five electrodes 84 are used to activate the piezoelectric element 80. Applying a potential to the electrodes 84 causes the piezoelectric element 80 to deform so that, in turn, the copper substrate 78 deforms, as shown in FIG. 6. This creates a convex-shaped mirror 50.

As the mirror 50 deforms, it remains firmly held in place against the support surface 72 and support shoulder 64 because the beam 62 deflects with the mirror 10 by flexing about its neck 68, as shown in FIG. 6. Moreover, the beams 72 offer minimal resistance to the mirror 50 as its peripheral edge 74 rotates towards the mirror axis. This is because they have minimal stiffness radially and so require little force to deform radially towards the mirror centre. The mass and stiffness of the beams 62 are very small in comparison to that of the mirror 50 and therefore the beams 62 have minimal impact upon the mirror 50 deformation. In addition, the relatively large width W of the beams 62 provides stiffness in all directions in the plane of the mirror and torsionally about the mirror axis. The short length of the beams 62 provides stiffness in the axial direction.

FIG. 6 shows that convex deformation of the mirror 50 extends to the very edge 74 of the mirror 50 and hence eliminates virtually all dead space from the mirror 50. Hence, the active area of the mirror 50 covers virtually the whole of the mirror 50. This is highly beneficial because a mirror mount 52 that prevents rotation of the mirror's peripheral edge 74 would need to be twice the diameter to obtain a similar convex active area and would have a first mode resonant frequency of half that of the simply supported mirror 50 of the present invention. Thus, the present invention allows for a mirror 50 of much smaller size to be used to obtain the same stroke/bandwidth product.

The person skilled in the art will appreciate that modifications can be made to the embodiments described hereinabove without departing from the scope of the invention.

Details of the mirror 50 and how it is arranged to deform are given as useful background in which to set the context of the present invention, but are not essential to the invention. Other mirror configurations can be equally well accommodated by the present invention.

Whilst the above embodiment uses L-shaped beams 62, strict compliance with this shape is not necessary. For example, the support shoulders 64 may be omitted and the peripheral edge of the mirror 74 may abut against the upright face of the beam 62. This arrangement would lead to a longer neck 68 that could flex along its entire height. In addition, the beam 62 could be J-shaped rather than being L-shaped. This may be advantageous where the mirror 50 has rounded edges rather than square edges. In fact, the beam 62 may be shaped to conform to any profile the mirror 10 may have, e.g. to conform to chamfered edges.

Figure 9:
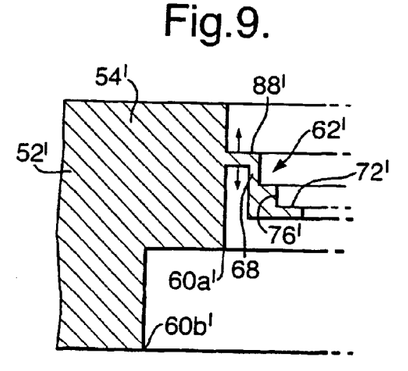
FIG. 9 corresponds to FIG. 7 but for a second embodiment of the present invention.

Furthermore, the beams 62 need not necessarily extend downwardly from the mount body 54 to house the mirror 50 within the mount body 54. An alternative arrangement is shown in FIG. 9, that broadly corresponds to the view shown in FIG. 7 and so like reference numerals have been used for like parts but with the addition of a prime. In this embodiment, the flexible neck 68' is L-shaped such that, in addition to the flexible upright portion that allows deflection as the mirror 50 deforms, there is a horizontal portion 88' that connects the upright portion to the mount body 54. The horizontal portion 88' of the beam 62' allows vertical movement of the edges of the mirror 50, as indicated by the arrows in FIG. 9. This is beneficial because the mirror 50 may be deformed to adopt shapes that require relative movement around the edge 74 of the minor 50, e.g. to adopt radially-extending ridges and troughs thereby creating an undulating mirror edge 74.

Figure 10:
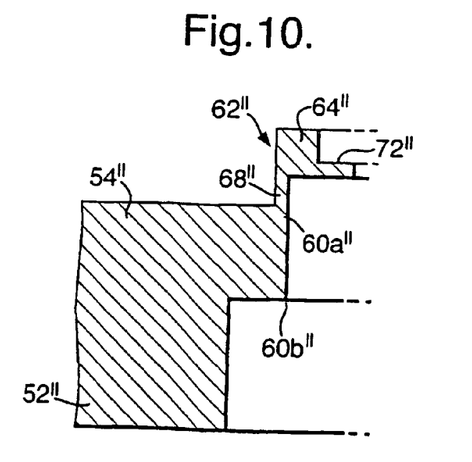
FIG. 10 corresponds to FIG. 7 but for a third embodiment of the present invention.

A further alternative arrangement of the beams 62 is shown in FIG. 10 where beams 62" extend upwardly from the mount body 54" (like reference numerals are used for like parts, the double prime denoting the parts that belong to the embodiment of FIG. 10). Most importantly they retain the flexible neck 68" that allows the beam 62" to bend with the mirror (not shown) as it adopts a convex shape.

Figure 11:
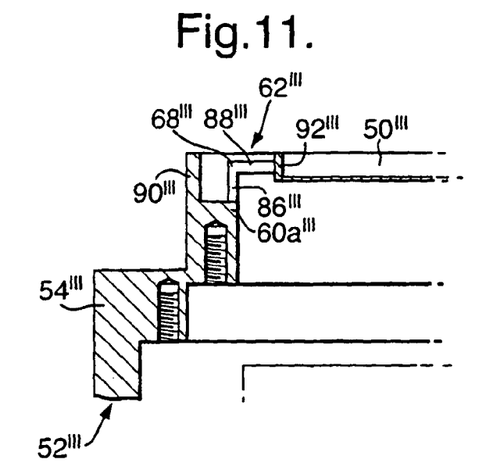
FIG. 11 is a cross-sectional view of a fourth embodiment of the present invention.
Figure 12:
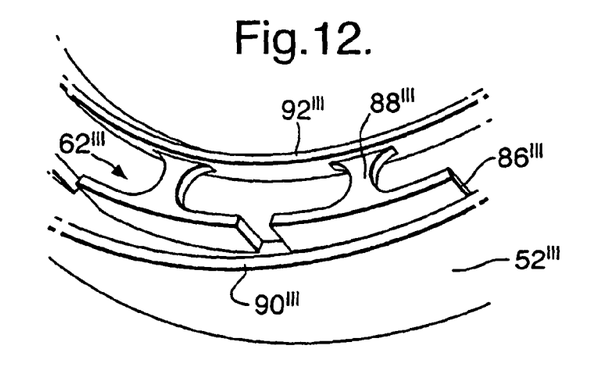
FIG. 12 is a perspective view of part of the mount of FIG. 11, with the mirror removed.
Figure 13:
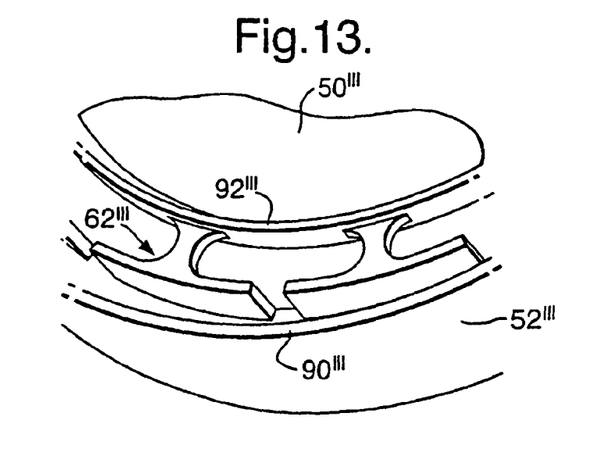
FIG. 13 is a further perspective view of a part of the mount of FIG. 11, with the mirror in place.

A yet further embodiment is shown in FIGS. 11 to 13. Again, like reference numerals are used for like parts, the triple prime denoting the parts that belong to the embodiment of FIGS. 11 to 13. In this embodiment, the mirror 50''' is supported at the top of the mount 52'''. The mount 52''' has an outer wall 90''' extending from the outer edge of its top surface. Twenty flexible beams 62''' extend from the inner edge 60a''' of the mount 52'''. The flexible beams 62''' comprise an L-shaped flexible neck 68''' that extends from the mount 52'''' first upwardly as an upright portion 86''' before turning through 90° to extend inwardly as a horizontal portion 88'''. The horizontal portion 88''' of each of the flexible beams 62''' meets a unitary L-shaped annular ring 92''' that is shaped and sized to receive the mirror 50'''. The L-shape of the ring 92''' is such that it supports the mirror 50''' from the side and from below.

The advantage of this arrangement is that the shape of the flexible beams 62''' allows vertical movement of the mirror's edge. This provides additional enhancement by further minimising the ratio of the total diameter of the mirror 50''' to the active diameter. This reduces the overall mirror diameter required to achieve a given stroke for a set applied voltage and bandwidth by virtually eliminating any dead space from the outside of the mirror 50'''.

Figure 14A:
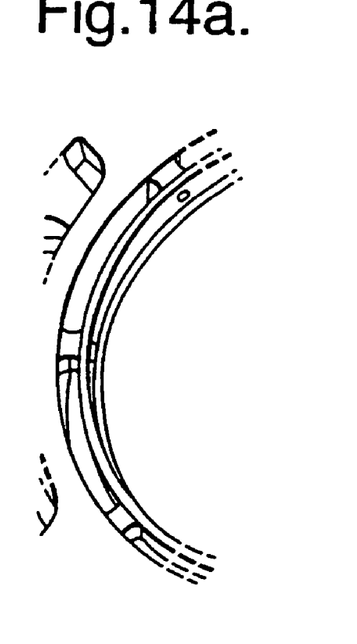
FIG. 14 is a view of a bar flexure design embodying the present invention from above (a) and below (b)
Figure 14B:
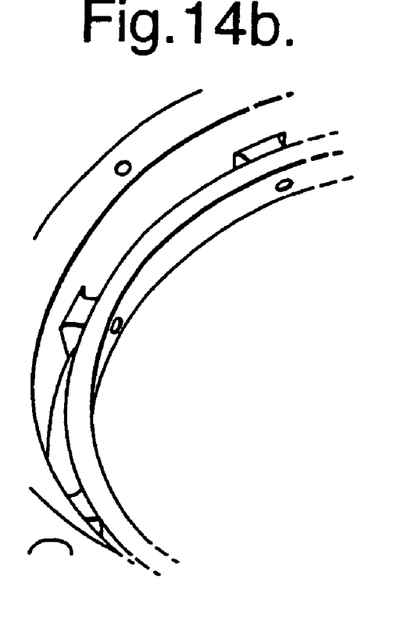
Figure 15:
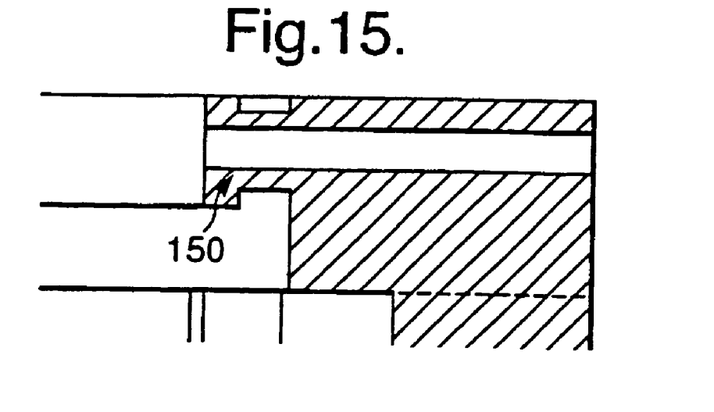
FIG. 15 is a cross-sectional view of the embodiment of FIG. 14.
Figure 16:
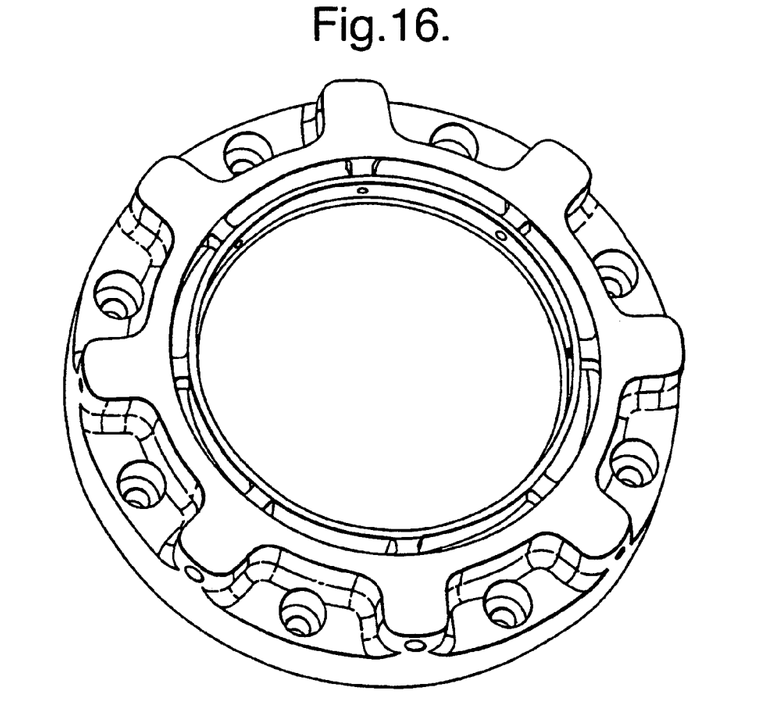
FIG. 16 is a view of the mirror mount using the bar flexure design of FIG. 14 (without the mirror in place)

A yet further embodiment of the invention is shown in FIGS. 14 to 16. FIG. 14 provides a view of a bar flexure design from above (a) and below (b). FIG. 15 corresponds to a cross-sectional view of FIG. 14 through one of the bar flexures 150. FIG. 16 is a view of the whole mirror mount (without the mirror) using the bar flexure design of FIG. 14. In this embodiment, the flexure is a bar 150 supporting a continuous ring, which in turn is used to support the mirror, but in this case fewer flexures are required. Conveniently, as shown, a hole is machined down the middle of the bar flexure in order to reduce the rigidity of the flexure.

The advantage of the arrangement shown in FIGS. 14 to 16 is that the bar shape of the flexures allows vertical movement at the mirror's edge. This arrangement bears the additional advantage of being a straightforward design, making the mirror holder easy to machine.

It is also to be appreciated that standard methods for making connections to the piezoelectric (PZT) elements on a bimorph mirror are to either solder the wires on, or to use a conducting epoxy. Both of these methods are effective when the number of electrodes is relatively small e.g. up to 40. However, as the number of electrodes go up, making the connections becomes progressively more difficult:

soldering onto the PZT element needs to be done quickly in order to ensure that the material does not de-pole slightly in the process. When 40 solder joints are required, this becomes more difficult. If all the electrodes are soldered at the same time, the risk of the material de-poling becomes that much greater. This can be avoided by letting the material cool down before starting the next joint, but this is time consuming.

Using conductive epoxies is not that easy either. Care needs to be taken to ensure that not too much epoxy is used each time in order to avoid adding extra load onto the system. Also, the wires typically need supporting while the epoxy sets.

Wire bonding is seen by the inventors as a possible alternative to the above described techniques, but care must be taken in order to ensure that the wires do not touch. The inventors have recognised that careful application of the wire bonding technique bears the following definite advantages:

Wire bonding can be automated, making the process quick and consistent with commercial assembly.

Because the footprint of a wire bond is so small, the process does not add any significant load to the disc, even when a large number of connections (e.g. >100) are required.

The expected current to each element is relatively small (6 mA) and is consistent with wire bonding techniques.

The bend that is normally put into the bond wire during the bonding process ensures that the small amount of movement that the bond will be subjected to will not weaken the bond or the wire.

Figure 17:
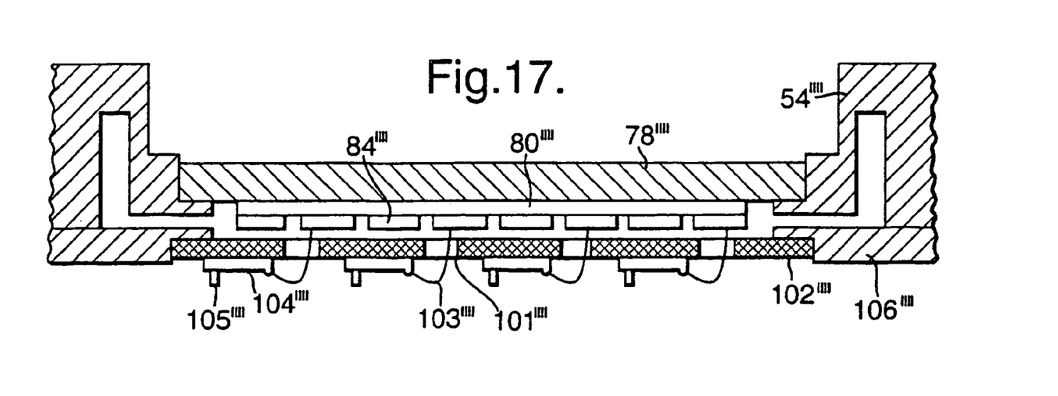
FIG. 17 shows one way of effectively applying wire bonding techniques for the purpose of making connections to the piezoelectric (PZT) elements in an embodiment of the present invention.

Having regard to the foregoing, wire bonding can be provided and FIG. 17 shows one way of accomplishing this. Again, like reference numerals are used for like parts, the four primes denoting the parts that belong to the embodiment of FIG. 17. As shown in FIG. 17, a hole 101'''' is punched through the PCB 102'''' above each piezoelectric (PZT) electrode 84'''' in order to enable access. This hole could typically be ~2mm in diameter and still provide access. As shown, the PCB sits very close to the PZT disc 80'''', but must be at least twice as far as the movement expected from the mirror. The wire bond 103'''' makes the connection between the PZT electrode 84 and the PCB track 104"". A solder pin 105"" can be used for soldering to an external cable. The holder for the PCB 106"" is attached to the mirror base 54"".

It is envisaged that this wire bond technique can be suitably used with other types of mounting arrangement if desired (for example, where the mirror is fixed rigidly).

As will be appreciated by the skilled person, other arrangements of the flexures/beams are possible. For example, the flexible beams 62 could extend inwardly to meet a supporting end of the beam 62. Essentially, any arrangement could be used where the supporting end of the beam 62 is connected to the mount body 54 by a flexible neck 68 that allows the supporting end to bend as the mirror 10 deforms.

Whilst the mount 52 of the above embodiments is made from stainless steel, many other materials such as other metals, plastics, glasses or ceramics could be used instead.

The present invention is perfectly well suited for use in supporting both uncooled and cooled bimorph mirrors. For example, the bimorph mirror may be water-cooled in order to dissipate heat absorbed from incident radiation.

The invention claimed is:

1. A deformable mirror apparatus comprising:
a deformable mirror,
a mounting body having an aperture in which the deformable mirror is received, and flexible structure extending across the aperture to the mirror, and
a deformation device for controllably deforming the mirror, the deformation device acting on the mirror other than through the flexible structure comprising a plurality of flexible beams arranged around the entire periphery of the aperture, the flexible structure having an end shaped to provide a supporting surface supporting the mirror, and a flexible portion linking the supporting surface to the body and permitting movement of an edge of the mirror relative to the body when the mirror is deformed by the deformation device, wherein at least one beam is generally L-shaped such that one leg of the L-shape provides the flexible portion and the other leg of the L-shape provides the supporting surface of the end of the beam, wherein the peripheral edge of the mirror is supported from below by one leg of the L-shaped beam and is supported from the side by the other leg of the L-shaped beam.

2. A deformable-mirror holder comprising:
a deformable-mirror holder comprising a rigid body with a central aperture for receiving a deformable mirror, the mirror having a deformation device for deforming the mirror attached thereto, and
a plurality of flexible beams around the entire periphery of said central aperture for supporting said mirror at an edge thereof, each flexible beam comprising a support for said mirror, said support permitting movement of said mirror edge when said mirror is deformed by said deformation device, said support including an end shaped to provide a supporting surface for supporting said deformable mirror and a flexible portion that links said end of the beam to said body of the holder, wherein at least one beam is generally L-shaped such that one leg of the L-shape provides the flexible portion and the other leg of the L-shape provides the supporting surface of the end of the beam, wherein the internal corner of the L-shaped beam has a shoulder that extends part of the way along both legs of the L-shape.

3. A deformable-mirror holder as in claim 2, wherein the ends of the flexible beams are co-joined to form a unitary structure shaped to provide said supporting surface.

4. A deformable-mirror holder as in claim 2, wherein the ends of the beams lie in the plane of the body of the holder such that, in use, the mirror is received within the body of the holder.

5. A deformable-mirror holder as in claim 2, wherein the width of the beams is larger than a separation between beams.

6. A deformable-mirror holder as in claim 5, wherein the width of the beams is greater than four times the separation between beams.

7. A deformable mirror holder as in claim 2, wherein the body is a unitary structure.

8. Deformable mirror apparatus comprising:
a deformable mirror,
a mounting body having an aperture in which the deformable mirror is received, and flexible structure extending across the aperture to the mirror, and
a deformation device for controllably deforming the mirror, the deformation device acting on the mirror other than through the flexible structure comprising a plurality of flexible beams arranged around the entire periphery of the aperture, the flexible structure having an end shaped to provide a supporting surface supporting the mirror, and a flexible portion linking the supporting surface to the body and permitting movement of an edge of the mirror relative to the body when the mirror is deformed by the deformation device, wherein at least one beam is generally L-shaped such that one leg of the L-shape provides the flexible portion and the other leg of the L-shape provides the supporting surface of the end of the beam, wherein the internal corner of the L-shaped beam has a shoulder that extends part of the way along both legs of the L-shape.

9. A deformable mirror apparatus as in claim 8 wherein the flexible portion permits rotation of the edge of the mirror.

10. A deformable mirror apparatus as in claim 8 wherein the flexible portion permits displacement of the edge of the mirror axially of the mirror.

11. A deformable mirror apparatus comprising:
a deformable mirror,
a mounting body having an aperture in which the deformable mirror is received, and flexible structure extending across the aperture to the mirror, and
a deformation device for controllably deforming the mirror, the deformation device acting on the mirror other than through the flexible structure, the flexible structure comprising a plurality of flexible beams, each beam having an end shaped to provide a supporting surface supporting the mirror, and a flexible portion linking the supporting surface to the body and permitting movement of an edge of the mirror relative to the body when the mirror is deformed by the deformation device, each beam being generally L-shaped such that one leg of the L-shape provides the flexible portion and the other leg of the L-shape provides the supporting surface of the end of the beam, the peripheral edge of the mirror being supported from below by one leg of the L-shaped beam and being supported from the side by the other leg of the L-shaped beam.

12. A deformable-mirror apparatus as in claim 11, wherein the ends of the flexible beams are co-joined to form a unitary structure shaped to provide said supporting surface.

13. A deformable-mirror apparatus as in claim 11, wherein the ends of the flexible structure lie in the plane of the body such that the mirror is received within the body.

14. A deformable-mirror apparatus as in claim 11, wherein the width of the beams is larger than a separation between beams.

15. A deformable-mirror apparatus as in claim 14, wherein the width of the beams is greater than four times the separation between beams.

16. A deformable mirror apparatus comprising:
   a deformable mirror,
   a mounting body having an aperture in which the deformable mirror is received, and flexible structure extending across the aperture to the mirror, and
   a deformation device for controllably deforming the mirror, the deformation device acting on the mirror other than through the flexible structure, the flexible structure comprising a plurality of flexible beams, each beam having an end shaped to provide a supporting surface supporting the mirror, and a flexible portion linking the supporting surface to the body and permitting movement of an edge of the mirror relative to the body when the mirror is deformed by the deformation device, each beam being generally L-shaped such that one leg of the L-shape provides the flexible portion and the other leg of the L-shape provides the supporting surface of the end of the beam, and wherein the internal corner of the L-shaped beam has a shoulder that extends part of the way along both legs of the L-shape.

17. A deformable mirror apparatus as in claim 16, wherein the peripheral edge of the mirror is supported from below by one leg of the L-shaped beam and is supported from the side by an inwardly-facing side of the shoulder.

* * * * *